United States Patent [19]
Hayenga et al.

[11] Patent Number: 5,361,140
[45] Date of Patent: Nov. 1, 1994

[54] METHOD AND APPARATUS FOR DYNAMIC CORRECTION OF MICROSCOPIC IMAGE SIGNALS

[75] Inventors: Jon W. Hayenga, Kent; Robert C. Schmidt, Redmond, both of Wash.

[73] Assignee: NeoPath, Inc., Bellevue, Wash.

[21] Appl. No.: 838,065

[22] Filed: Feb. 18, 1992

[51] Int. Cl.$^5$ .............................................. H04N 1/40
[52] U.S. Cl. .................... 358/446; 358/475; 358/406; 358/487; 358/443; 358/471; 348/255; 348/257
[58] Field of Search ............... 358/445, 475, 446, 461, 358/444, 480, 482, 483, 406, 487, 447, 213.18, 213.19, 228, 211, 113; 250/208.1; 348/255, 257, 229, 230, 241

[56] References Cited

U.S. PATENT DOCUMENTS

| | | | |
|---|---|---|---|
| 4,860,108 | 8/1989 | Saito et al. | 358/213.19 |
| 4,920,428 | 4/1990 | Lin et al. | 358/213.18 |
| 4,954,897 | 9/1990 | Ejima et al. | 358/213.19 |
| 4,972,266 | 11/1990 | Tani | 358/213.19 |
| 4,980,778 | 12/1990 | Wittman | 358/475 |
| 5,084,772 | 1/1992 | Shimoyama | 358/475 |
| 5,101,271 | 3/1992 | Andrews et al. | 358/113 |
| 5,162,644 | 11/1992 | Nagata et al. | 358/482 |
| 5,204,761 | 4/1993 | Gusmano | 358/471 |

FOREIGN PATENT DOCUMENTS 0004272  1/1984  Japan ................. H04N 1/40

Primary Examiner—Edward L. Coles, Jr.
Assistant Examiner—Fan Lee
Attorney, Agent, or Firm—Leone & Moffa

[57] ABSTRACT

A circuit is provided for correcting an image signal received from a camera wherein the camera includes a plurality of charge coupled devices, each for providing a light signal indicative of the intensity of light incident thereon and wherein the plurality of light signals from the plurality of charge coupled devices are indicative of an image received by the camera. The correction circuit includes a gain memory for storing a plurality of gain correction factors wherein each gain correction factor is associated with a respective charge coupled device of the camera. The correction circuit further includes an offset memory for storing a plurality of offset correction factors wherein each offset correction factor is associated with a respective one of the plurality of charged coupled devices. The gain memory is responsive to a control circuit for multiplying the plurality of electric signals by the appropriate gain correction factor. Similarly, the offset memory is responsive to a control circuit for adding the appropriate one of the plurality of offset correction factors with the signal from its respective charge coupled device. A light detection circuit is also provided for normalizing the corrected plurality of signal to make the resulting measurement a measurement of the percentage of transmission of the focused slide specimen.

22 Claims, 2 Drawing Sheets

METHOD AND APPARATUS FOR DYNAMIC CORRECTION OF MICROSCOPIC IMAGE SIGNALS

TECHNICAL FIELD

The present invention is directed toward apparatus for providing signals representing an image of an object and, more particularly, toward method and apparatus for dynamically correcting image signals for variations in the illumination of the image or the detection of the image by the camera.

BACKGROUND OF THE INVENTION

Systems for providing image signals typically include a camera positioned to be focused upon an object and constructed for providing image signals representing an image of the object. Typically, these systems include cameras having an array of discrete charge coupled devices ("CCDs"), referred to as pixels, for providing electrical signals wherein the magnitude of the electrical signal is indicative of the intensity of light incident upon each pixel. By properly timing the manner that the plurality of signals are obtained from the camera, the plurality of signals can be used to represent an image of an object upon which the camera is focused.

However, several factors contribute to fixed pattern variations of the plurality of discrete pixel elements imaged by the camera. One factor, referred to herein as illumination variation, results from nonuniformity in illumination caused by optical element imperfections, dust collection, and positioning variations. Another factor, referred to herein as CCD variation, results from two types of imperfections in the performance of the CCDs. One performance imperfection results from size tolerance variations on the active area sensitive to light for each pixel. These size imperfections result in sensitivity variations between pixel on a given sensor that are mathematically equivalent to illumination variation. Illumination variation, whether caused by nonuniformity in illumination or by CCD size variations are corrected for using gain correction.

Another factor that contributes to fixed pattern variations is also caused by CCD performance imperfections. This factor is referred to as offset variation and is caused by the dark current signal within the CCD, i.e., the current signal that is present at the CCD when no light is incident on the CCD. The offset variation is determined as the magnitude of the signal from a pixel when no light is incident upon the pixel. Illumination variation and offset variation present themselves as two types of errors in the resulting signal from each pixel.

It is desirable, therefore, to provide method and apparatus for correcting image signals from a camera for illumination variation, resulting from nonuniformity in illumination and from CCD size variation. It is also desirable to provide method and apparatus for correcting image signals from a camera for offset variation resulting from CCD dark current.

Further, in order to obtain a plurality of signals from the array of pixel elements that most accurately represent an image of the object, it is necessary to correct each pixel for the above mentioned variations in offset and illumination. Most prior art systems for collecting image signals have attempted to provide data processing methods for correcting the plurality of signals. However, these methods cannot be performed at the same speed that the signals are obtained from the camera and, therefore, introduce significant delay in the time required to obtain an image signal. Further, these methods are also not accurate. Accordingly, it is desirable to provide method and apparatus for correcting a plurality of signals from a CCD camera wherein the correction can be made rapidly while the plurality of signals are obtained from the camera and wherein the correction is made prior to the analog-to-digital conversion, to utilize the maximum number of quantization steps to measure signal levels.

SUMMARY OF THE INVENTION

The present invention comprises a circuit for real time correction of an image signal provided by a camera wherein the image signal represents the image of an object. The camera may include a plurality of charge coupled devices for providing a respective plurality of pixel signals wherein the plurality of pixel signals combine to provide the image signal. The circuit of the subject invention includes memory for storing a plurality of correction factors wherein each of the plurality of correction factors is associated with a respective one of the plurality of charge coupled devices. The circuit also includes signal processing means for combining each of the plurality of correction factors with the respective one of the plurality of pixel signals with which it is associated. In a first presently preferred embodiment of the invention, the correction factors are related to the incident, unmodulated light and gain of the individual charge coupled devices and the signal processing circuit is a circuit constructed to multiply the correction factors by the plurality of pixel signals. In a second presently preferred embodiment of the invention, the correction factors are offset correction factors associated with the offsets of the plurality of charge coupled devices and the signal processing circuit is an adder for adding the plurality for offset correction factors to the plurality of pixel signals.

In still another embodiment of the invention, the apparatus includes a light assembly for providing light to illuminate the object and for providing a light signal indicative of the intensity of the light. The signal processing circuit is further responsive to the light signal for altering the reference and offset factors so that the image signal is corrected for variations in the intensity of the light.

DETAILED DESCRIPTION OF THE INVENTION

Figure 1:
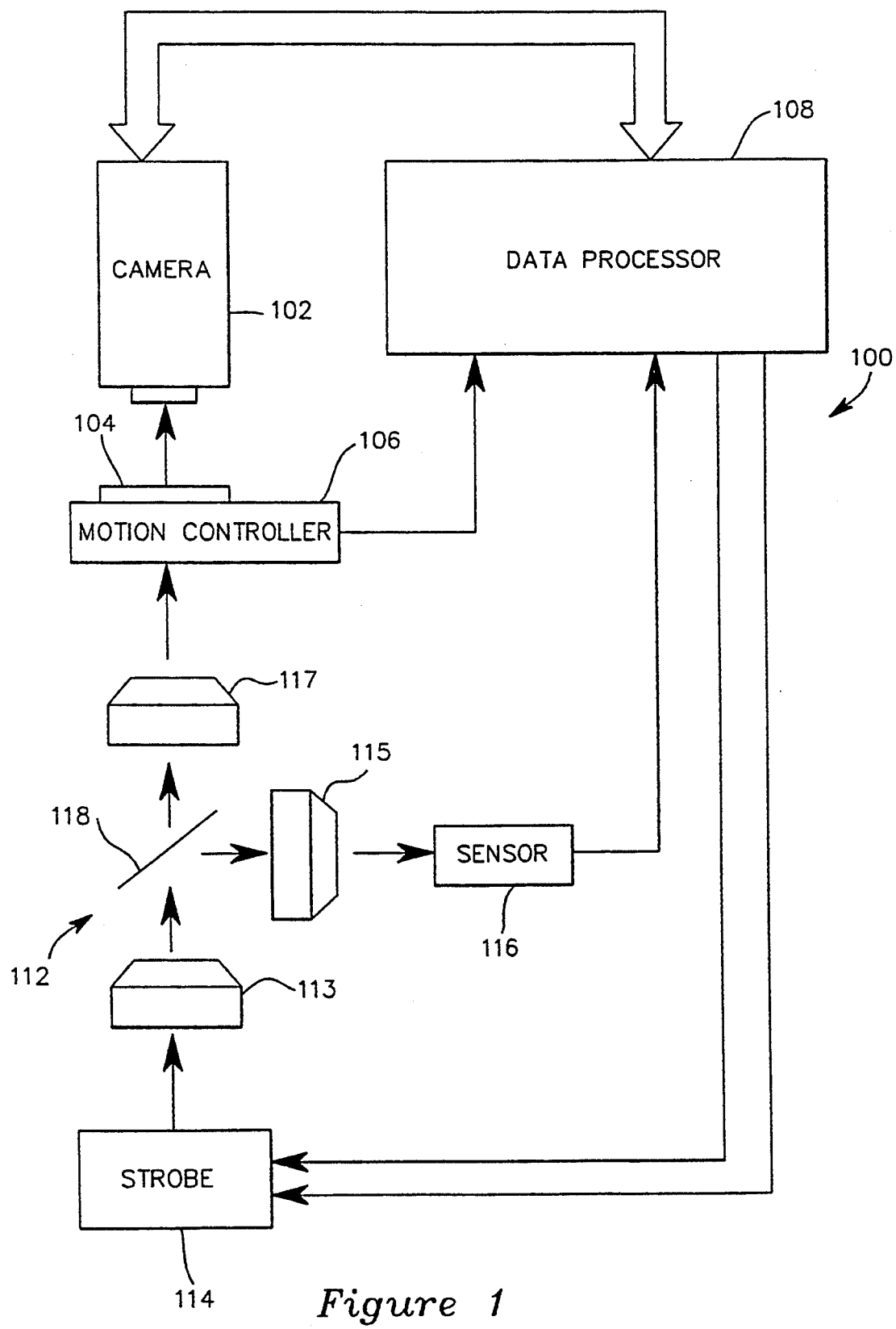
FIG. 1 is an illustrative diagram of a camera system constructed in accordance with the present invention.

The subject invention provides method and apparatus for dynamically correcting image signals from a camera for fixed pattern variation in gain, illumination, and offset. A camera system 100 is illustrated in FIG. 1. The camera system 100 includes a CCD camera 102 for providing an image signal representing the image of an object. As an example, the camera system 100 may be a camera system for obtaining and analyzing medical specimens, such as shown and described in U.S. patent application Ser. No. 07/838,065, for *Method and Apparatus for Rapid Capture of Focused Microscopic Images,* by Jon W. Hayenga et. al., filed Feb. 18, 1992, U.S. patent application Ser. No. 07/838,064, for *Method for Hentifying Normal Biomedical Specimens,* by Alan C. Nelson et al., filed Feb. 18, 1992, U.S. patent application Ser. No. 07/838,070, for *Method and Apparatus for Rapidly Processing Data Sequences,* by Richard S. Johnston et. al., filed Feb. 18, 1992, and U.S. patent application Ser.No. 07/838,395, entitled *Method For Identifying Objects Using Data Processing Techniques,* by S. James Lee, filed Feb. 18, 1992, the disclosures of which are incorporated herein, in their entirety, by the foregoing references thereto. However, those skilled in the art will appreciate that the subject invention is applicable to camera systems 100 constructed for obtaining the image signal of a wide variety of transmissive objects.

The slide 104 is mounted to a motion controller 106 that provides a scan signal to a data processor 108 to indicate that the slide 104 is being moved into position for an image to be obtained. The motion controller 106 may comprise any of a variety of suitable devices readily available to those skilled in the art.

An illumination system 112 includes a strobe light 114, a photodetector sensor 116, and a beam splitter 118. The illumination system 112 may also include collector and projection optics 113, a lense and aperture 115, and a condenser lens and aperture 117, discussed in more detail below. The strobe light 114 is responsive to a flash signal received from the data processor 108 for providing a flash of light. The strobe light 114 is also responsive to an intensity signal for varying the intensity of the flash of light provided. The data processor 108 is responsive to the scan signal for synchronizing the camera 102 and the strobe light 114 to gather the image. Suitable strobe lights 114 for operation with the subject invention as described herein may be readily selected by those skilled in the art from a variety of strobe lights that are commercially available. Further, it will be apparent to those skilled in the art that, although the present invention is described by reference to a strobe light 114, for providing a flash of light, other devices constructed to provide a continuous source of light may be readily substituted therefor without departing from the true scope and spirit of the subject invention.

The photodetector sensor 116 is constructed to receive a portion of the flash of light from the strobe light 114 via a beam splitter 118. The beam splitter 118 may comprise any of a variety of devices commercially available for splitting a beam of light into component parts. The photodetector sensor 116 is constructed to provide a light signal indicative of the intensity of light provided by the strobe light 114. The light signal is coupled to the data processor 108 and is used for correcting the image signal received from the camera 102, as will be described in more detail below.

The collector and projection optics 113, the lense and aperture 115, and the condenser lens and aperture 117 are each provided for optically transmitting the flash of light from the strobe light 114 to the photodetector sensor 116 and the slide 104. Standard elements appropriate for optically transmitting the flash of light are commercially available and may be readily selected by those skilled in the art. Additionally, it will be apparent to those skilled in the art that alternative arrangements for optically transmitting the flash of light from the strobe light 114 to the photodetector sensor 116 and the slide 104 may be provided without departing from the scope and spirit of the subject invention.

The camera 102 may comprise a video camera including a plurality of charge coupled devices for providing a plurality of signals wherein the plurality of signals may be combined to provide the image signal to the data processor 108. As is known in the art, the plurality of charge coupled devices, also referred to as pixel elements, each provides a signal indicative of the intensity of light incident thereon. However, since the plurality of pixel elements are discrete one from another, they each have slightly different gain and offset characteristics that introduce minor inaccuracy in the resulting image signals. Additionally the unmodulated illumination incident on the CCD pixels is nonuniform and, therefore, further reduces the accuracy of the resulting image signals. Accordingly, the data processor 108 includes circuitry for correcting the plurality of signals received from the pixel elements of the camera 102 for variation in offset, gain, and illumination nonuniformity between pixel elements.

Figure 2:
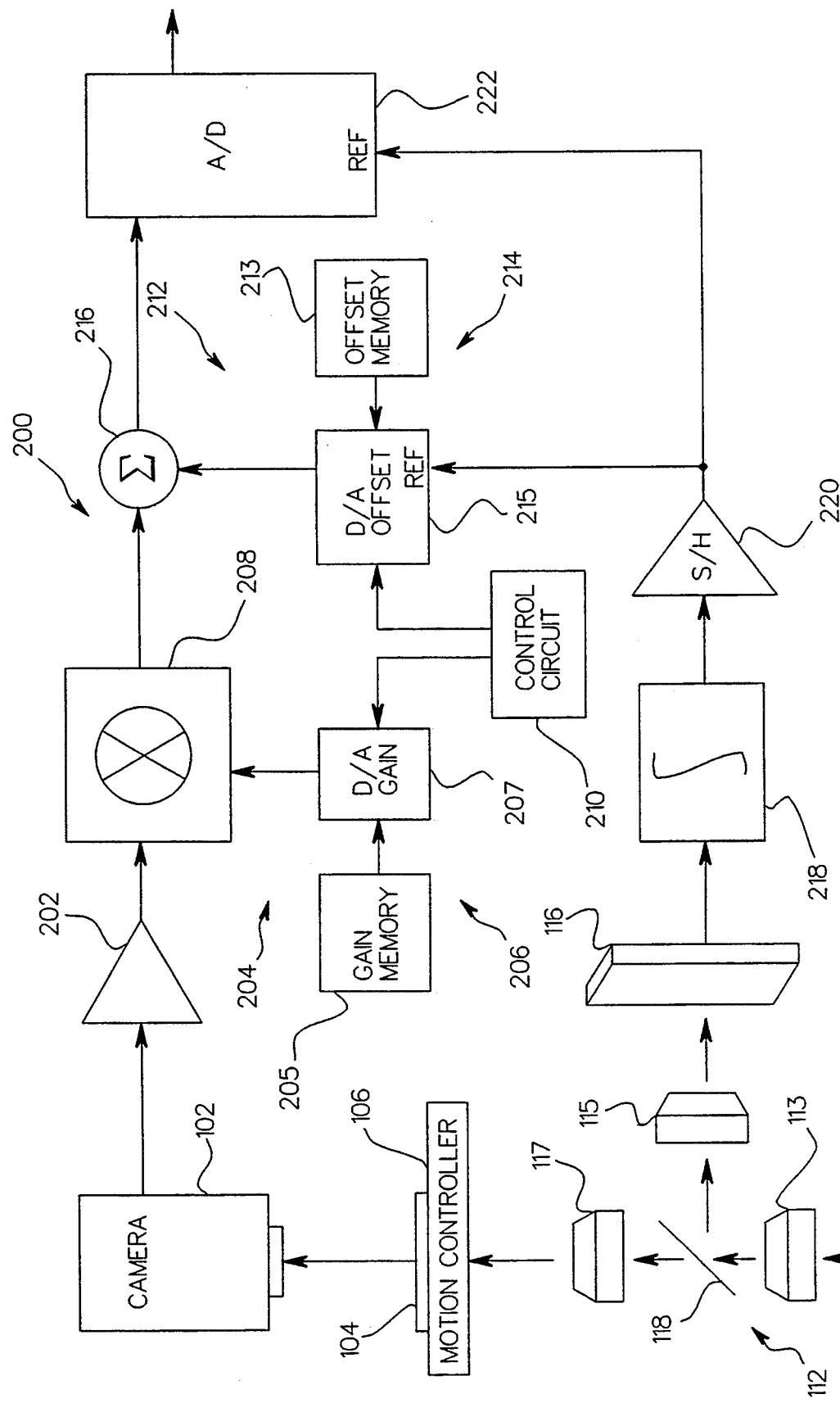
FIG. 2 is a more detailed illustrative diagram of the data processor illustrated in FIG. 1.

A suitable correction circuit 200 is illustrated in FIG. 2. The circuit 200 includes an amplifier 202 for receiving and amplifying the image signal provided by the camera 102. The amplifier 202 is coupled to a gain correction circuit 204 for correcting the image signal for pixel-to-pixel variation in gain and illumination. The gain correction circuit 204 includes a gain unit 206 coupled to a multiplication circuit 208 and responsive to timing and control signals received from a control circuit 210 for multiplying the image signal by a plurality of predetermined gain factors. The gain unit 206 comprises a memory unit 205 coupled to a digital-to-analog converter 207 for providing analog correction signals to the multiplication circuit 208. The memory 205 is selected to store predetermined correction factors. The digital-to-analog converter 207 is scaled so that its step resolution is less than that of the analog-to-digital converter 222. This allows the correction to be placed reasonably centered within the analog-to-digital converter step size and results in accurate correction without sacrificing the dynamic range of the analog-to-digital converter 222.

As discussed above, the image signal includes a plurality of signals obtained from an array of discrete charge coupled devices, or pixel elements, of the camera 102. As also discussed above, the gain and incident illumination of the plurality of charge coupled devices may vary slightly. Accordingly, a plurality of gain correction factors are stored in the memory 205 of the gain unit 206, each associated with a respective charge coupled device of the camera 102. The control circuit 210 provides timing and control signals to the gain unit 206 so that each gain factor is multiplied by its respective portion of the image signal in the multiplier 208, thereby correcting each respective portion of the image signal for any variation in its respective charge coupled device or incident illumination and, thereby, substantially eliminating undesirable effects of gain variation or illumination nonuniformity from the resulting image signals.

Similarly, an offset correction circuit 212 includes an offset unit 214 including an offset memory 213 for storing a plurality of offset correction factor, each associated with a respective one of the plurality of charge coupled devices of the camera 102, and a digital-to-analog converter 215. The offset correction circuit 212 includes an adder 216 for adding the image signal from the gain correction circuit 204 with the plurality of offset correction factors stored in the memory 213 of the offset unit 214. The offset unit 214 is responsive to timing and control signals received from the control circuit 210 for providing the offset correction factor to be added to the portion of the image signal associated with its respective charge coupled device.

Accordingly, the circuit described above provides apparatus for correcting the gain and offset of the signal received from each charge coupled device as the signal is provided by the camera 102. It will be apparent to those skilled in the art that the gain correction factors and the offset correction factors stored in the gain memory 205 of the gain unit 206 and the offset memory 213 of the offset unit 214, respectively, can be determined in a variety of ways. In a presently preferred embodiment of the invention, calibration slides 104 (FIG. 1) are provided so that the gain correction factors and offset correction factors can be determined and stored in the gain memory 205 of the gain unit 206 and the offset memory 213 of the offset unit 214, respectively. However, those skilled in the art will appreciate that many other methods and apparatus may be provided for determining the offset correction factors and the gain correction factors.

Further, it will be apparent to those skilled in the art that since the gain and offset correction are performed on analog signals, prior to the conversion by the analog-to-digital converter 222, the dynamic range of the analog-to-digital converter 222 need not be sacrificed. As an example, if the correction were performed after the conversion, then a portion of the dynamic range of the analog-to-digital converter 222 would be unused for signal levels that were lower than the peak signal level. Accordingly, this portion of the range of the converter is essentially lost to the image signals.

Still further, the subject invention provides apparatus for varying the offset in response to variation in the intensity of light provided by the strobe light 114. The photodetector sensor 116 provides the light signal to an integrator 218 for determining the total energy detected by the photodetector sensor 116. The integrator 218 is sampled by a sample and hold circuit 220, the output of which is indicative of the energy provided by the strobe fight 114 and, is therefore indicative of the energy provided to the slide 104. The offset unit 214 is responsive to the signal provided by the sample and hold circuit 220 for varying the individual offset correction factors. To this end, the reference input of the digital-to-analog converter of the offset unit 214 is coupled to receive the signal from the sample and hold circuit 220 so that variation in the intensity of light provided by the strobe light 114 will result in varying the reference for determining the conversion of the proper digital quantity to the analog signal. This allows for variation in the offset as a function of the strobe intensity so that the offset may be selected to cover any range without sacrificing the dynamic range of the analog to digital circuit 222.

In similar fashion, an analog-to-digital circuit 222 includes a reference input coupled to receive the light signal from the sample and hold circuit 220. The analog-to-digital circuit 222 is constructed for converting the analog image signal received from the offset correction circuit 212 into a plurality of digital signals wherein the plurality of digital signals represent the image of the slide 104. Since the reference input of the analog-to-digital circuit 222 receives the light signal from the sample and hold circuit 220, the dynamic range of the analog-to-digital convertor 222 is modulated in proportion to the intensity of light provided by the strobe light 114 so that variations in the intensity of light provided by the strobe light will not affect the image signals, and so that the image signal is a direct measure of the transmissivity of the specimen, independent of the intensity of light provided by the strobe light 114.

It will be apparent to those skilled in the art that although only several presently preferred embodiments of the invention have been described in detail herein, many modifications and variations may be provided without departing from the true scope and spirit of the invention. Accordingly, the invention is not limited except as by the appended claims.

We claim:

1. Apparatus for dynamically correcting an image signal comprising:

camera means for providing an image signal, wherein the image signal represents a tranmissivity of an object;

light means for providing light to illuminate the object and for providing a light signal indicative of the intensity of said light; and data processing means responsive to said light signal for dynamically correcting said image signal so that said image signal is corrected for variations in the intensity of said light.

2. The apparatus as recited in claim 1 wherein said data processing means comprises an analog-to-digital converter having an analog input for receiving the image signals and a reference input for receiving said light signal, said analog-to-digital converter having an output providing the corrected image signals.

3. The apparatus as recited in claim 1 wherein the camera includes a plurality of charge coupled devices for providing a respective plurality of pixel signals and wherein the plurality of pixel signals combine to provide the image signal, said data processing means comprising:

offset correction means for storing a plurality of offset correction factors, each associated with a respective one of said plurality of charge coupled devices, said offset correction means being further constructed to combine said plurality of offset correction factors with the respective ones of the plurality of pixel signals to thereby correct the image signal for variation in offsets between the plurality of charge coupled devices.

4. The apparatus as recited in claim 3 wherein said offset correction means further comprises means responsive to variations in the intensity of said light signal for varying the value of said plurality of offset correction factors as the image signal is provided by the camera.

5. The apparatus as recited in claim 3 wherein said offset correction means further comprises:

memory means for storing said plurality of offset correction factors; and a digital-to-analog converter having a digital input for receiving the plurality of offset correction factors and a reference input for receiving said light signal, said digital-to-analog converter having an output providing the plurality of offset correction factors in response to the light signal.

6. The apparatus as recited in claim 1 wherein the camera includes a plurality of charge coupled devices for providing a respective plurality of pixel signals wherein the plurality of pixel signals combine to provide the image signal, said data processing means comprises:

gain correction means for storing a plurality of gain factors, each associated with a respective one of said plurality of charge coupled devices, said gain correction means being further constructed to multiply said plurality of gain factors by the respective ones of the plurality of pixel signals to thereby correct the image signal for variations in the sensitivity and incident illumination of the plurality of charge coupled devices.

7. The apparatus as recited in claim 6, further comprising:
offset correction means for storing a plurality of offset correction factors, each associated with a respective one of said plurality of charge coupled devices, said offset correction means being further constructed to add said plurality of offset correction factors to the respective ones of the plurality of pixel signals to thereby correct the image signal for variation in offsets between the plurality of charge coupled devices.

8. The apparatus as recited in claim 7 wherein said offset correction means further comprises means responsive to the variations in the intensity of said light signal for varying the value of said plurality of offset correction factors as the image signal is provided by the camera.

9. The apparatus as recited in claim 7 wherein said offset correction means further comprises:
memory means for storing said plurality of offset correction factors; and
a digital-to-analog converter having a digital input for receiving the plurality of offset correction factors and a reference input for receiving said light signal, said digital to analog converter having an output which provides the plurality of offset correction factors in response to the light signal.

10. A circuit for correcting an image signal comprising:
camera means for providing an image signal, wherein the image signal represents a transmissivity of an object and wherein the camera includes a plurality of charge coupled devices for providing a respective plurality of pixel signals wherein the plurality of pixel signals combine to provide the image signal;
memory means for storing a plurality of correction factors wherein each of said plurality of correction factors is associated with a respective one of the plurality of charge couples devices;
signal processing means for combining each of said plurality of correction factors with the respective one of the plurality of pixel signals with which it is associated; and
light means for providing light to illuminate the object and for providing a light signal indicative of the intensity of said light, said signal processing means being responsive to said light signal for altering said plurality of correction factors.

11. The circuit as recited in claim 10 wherein said signal processing means further comprises means for adding said plurality of correction factors to the respective ones of the plurality of pixel signals.

12. The circuit as recited in claim 10 wherein said signal processing means further comprises means for multiplying said plurality of correction factors to the respective ones of the plurality of pixel signals.

13. The circuit as recited in claim 10 wherein said memory means comprises means for storing a plurality of gain correction factors each associated with a respective one of the plurality of charge coupled devices and a plurality offset correction factors each associated with a respective one of the plurality of charge coupled devices.

14. The circuit as recited in claim 13 wherein said signal processing means comprises:
an adder for adding said plurality of offset correction factors to the respective ones of the plurality of pixel signals; and
a multiplier for multiplying the plurality of gain correction factors to the respective ones of the plurality of pixel signals.

15. An apparatus for dynamically correcting an image signal provided by a camera wherein the image signal represents a transmissivity of an object, said apparatus comprising:
light means for providing light to illuminate the object and for providing a light signal indicative of the intensity of said light; and
data processing means responsive to said light signal for dynamically correcting said image signal so that said image signal is corrected for variations in the intensity of said light wherein said data processing means comprises an analog-to-digital converter having an analog input for receiving the image signals and a reference input for receiving said light signal, said analog-to-digital converter having an output providing the corrected image signals.

16. The apparatus as recited in claim 15 wherein the camera includes a plurality of charge coupled devices for providing a respective plurality of pixel signals and wherein the plurality of pixel signals combine to provide the image signal, said data processing means comprising an offset correction means for storing a plurality of offset correction factors, each associated with a respective one of said plurality of charge coupled devices, said offset correction means being further constructed to combine said plurality of offset correction factors with the respective ones of the plurality of pixel signals to thereby correct the image signal for variation in offsets between the plurality of charge coupled devices.

17. The apparatus as recited in claim 16 wherein said offset correction means further comprises means responsive to variations in the intensity of said light signal for varying the value of said plurality of offset correction factors as the image signal is provided by the camera.

18. The apparatus as recited in claim 16 wherein said offset correction means further comprises:
memory means for storing said plurality of offset correction factors; and
a digital-to-analog converter having a digital input for receiving the plurality of offset correction factors and a reference input for receiving said light signal, said digital-to-analog converter having an output providing the plurality of offset correction factors in response to the light signal.

19. The apparatus as recited in claim 15 wherein the camera includes a plurality of charge coupled devices for providing a respective plurality of pixel signals wherein the plurality of pixel signals combine to provide the image signals and said data processing means comprises a gain correction means for storing a plurality of gain factors, each associated with a respected one of said plurality of charge coupled devices, said gain correction means being further constructed to multiply said plurality of gain factors by the respective ones of the plurality of pixel signals to thereby correct the image signals for variations in the sensitivity and incident illumination of the plurality of charge coupled devices.

20. The apparatus as recited in claim 19, further comprising offset correction means for storing a plurality of offset correction factors, each associated with a respective one of said plurality of charge coupled devices, said offset correction means being further constructed to add said plurality of offset correction factors to the respective ones of the plurality of pixel signals to thereby correct the image signal for variation in offsets between the plurality of charge coupled devices.

21. The apparatus as recited in claim 20 wherein said offset correction means further comprises means responsive to the variations in the intensity of said light signal for varying the value of said plurality of offset correction factors as the image signal is provided by the camera.

22. The apparatus as recited in claim 20 wherein said offset correction means further comprises:
   memory means for storing said plurality of offset correction factors; and
   a digital-to-analog converter having a digital input for receiving the plurality of offset correction factors and a reference input for receiving said light signal, said digital-to-analog converter having an output which provides the plurality of offset correction factors in response to the light signal.

* * * * *

UNITED STATES PATENT AND TRADEMARK OFFICE
CERTIFICATE OF CORRECTION

PATENT NO. : 5,361,140
DATED : November 1, 1994
INVENTOR(S) : Jon W. Hayenga et al.

It is certified that error appears in the above-indentified patent and that said Letters Patent is hereby corrected as shown below:

Column 1, line 38 delete the word "pixel" and replace it with -- pixels --.

Column 2, line 67 delete the number "07/838,065" and replace it with --07/838,063--.

Column 3, line 3 delete the word "Hentifying" and replace it with -- Identifying --.

Column 4, line 7 delete the word "provides" and replace it with -- provide --.

Column 5, line 42 delete the word "fight" and replace it with -- light --.

Column 7, line 49 delete the word "couples" and replace it with -- coupled --.

Column 8, line 3 between the words "plurality" and "offset" insert the word -- of --.

Column 8, line 63 delete the word "signals" and replace it with -- signal --.

Signed and Sealed this

Twenty-third Day of May, 1995

*Attest:*

BRUCE LEHMAN

*Attesting Officer*     *Commissioner of Patents and Trademarks*